(12) United States Patent  
George (10) Patent No.: US 8,896,600 B2  
(45) Date of Patent: Nov. 25, 2014

(54) ICON SHADING BASED UPON LIGHT INTENSITY AND LOCATION

(75) Inventor: Moses George, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 839 days.

(21) Appl. No.: 13/071,345

(22) Filed: Mar. 24, 2011

(65) Prior Publication Data

US 2012/0242676 A1    Sep. 27, 2012

(51) Int. Cl.
```
G06T 15/50    (2011.01)
G01J 1/02     (2006.01)
G09G 5/22     (2006.01)
G01J 1/42     (2006.01)
```
(52) U.S. Cl.
CPC .............. *G01J 1/0233* (2013.01); *G01J 1/0266* (2013.01); *G09G 5/222* (2013.01); *G09G 2360/144* (2013.01); *G01J 1/4204* (2013.01)
USPC ............ 345/426; 345/581; 345/207; 345/589

(58) Field of Classification Search
CPC ......... G06T 15/06; G06T 15/50; G06T 15/80; G06T 15/83; G06T 15/87; G06F 9/4443; G06G 2360/14; G06G 2360/16; G06G 2360/144
See application file for complete search history.

(56) References Cited

U.S. PATENT DOCUMENTS

| | | | |
|---|---|---|---|
| 7,465,230 B2 | 12/2008 | LeMay et al. | |
| 7,616,201 B2 | 11/2009 | Foster | |
| 7,764,286 B1 | 7/2010 | Kumar | |
| 8,139,059 B2* | 3/2012 | Trepte | 345/426 |
| 2009/0085876 A1* | 4/2009 | Tschirhart | 345/173 |
| 2009/0217191 A1 | 8/2009 | Shin et al. | |
| 2011/0050630 A1 | 3/2011 | Ikeda | |

OTHER PUBLICATIONS

"Light Intensity." The Physics Classroom. (c) 1996-2012. Accessed via the Web @ http://www.physicsclassroom.com/getattachment/reasoning/light/src35.pdf on May 15, 2014.*
Nov. 8, 2010; Soft Shadows with Blender 3D; http://www.youtube.com/watch?v=frCNLpaEu64 >.
Noh, Z. et al., "Sort Shadow Rendering based on Real Light Source Estimation in Augmented Reality", Advances in Multimedia—An International Journal (AMIJ), vol. 1 Issue: 2, Oct. 30, 2010, 11 pages.

* cited by examiner

*Primary Examiner* — Antonio A Caschera
(74) *Attorney, Agent, or Firm* — Kilpatrick Townsend & Stockton LLP (57) ABSTRACT

Illustrated is a system and method to use a photometer to receive a light vector, the photometer to determine intensity of the light vector. The system and method also uses a processor to determine a location of a light source that generates the tight vector. Additionally, the system and method uses a touch-sensitive screen to display an icon pixel shaded based upon the intensity of the light vector and the location of the light source.

13 Claims, 13 Drawing Sheets

ICON SHADING BASED UPON LIGHT INTENSITY AND LOCATION

BACKGROUND

Desktop widgets (i.e., icon) are interactive virtual tools that provide single-purpose services such as showing the user the latest news, games, a dial pad, email, simple message service, the current weather, the time, a calendar, a dictionary, a map program, a calculator, desktop notes, photo viewers, or even a language translator, among other things. These icons may be in the form of an image formatted using a Portable Network Graphics (PNG) format, a Joint Photographic Experts Group (JPEG) format, a Graphics Interchange Format (GIF) or some other suitable bitmap image format. These bitmaps are made up of a plurality of pixels that are colored according to one or more red, green, and/or blue values applied separately or in combination.

BRIEF DESCRIPTION OF THE DRAWINGS

Some embodiments of the invention are described, by way of example, with respect to the following figures.

DETAILED DESCRIPTION

Illustrated is a system and method for generating a depth perception of icons based upon a light direction and intensity sensed by a camera of a mobile computing device. As used herein an icon is a pictogram used in graphical user interfaces (GUI) to supplement the presentation of textual information to the user. These icons are composed of a plurality of pixels arranged as a bitmap. A bitmap, as used herein, is a rectangular grid of pixels, where each pixel has an "X" and "Y" coordinate value.

In some example embodiments, a photometer, that is part of a camera of a mobile computing device, determines the intensity of a light vector (i.e., visible light) received from a light source and shades an icon to give the icon depth. In lieu of a photometer, in some example cases, a photo sensor, or photo detector may be used to determine the intensity of a light vector. An example camera is CCD digital camera (linear or 2D matrix). Intensity, as used here, is a measurement of light understood as a normalized candela value. Additionally, in some example cases, the direction of the light source relative to the mobile computing device may be determined using a triangulation operation. This direction of the light source may be used in the further shading of the icon. For example, icon pixels that are closer to the light source may be shaded a lighter color relative to icon pixels that are farther away from the light source. The method for shading these pixels is described in greater detail below.

Figures 1, 1A:
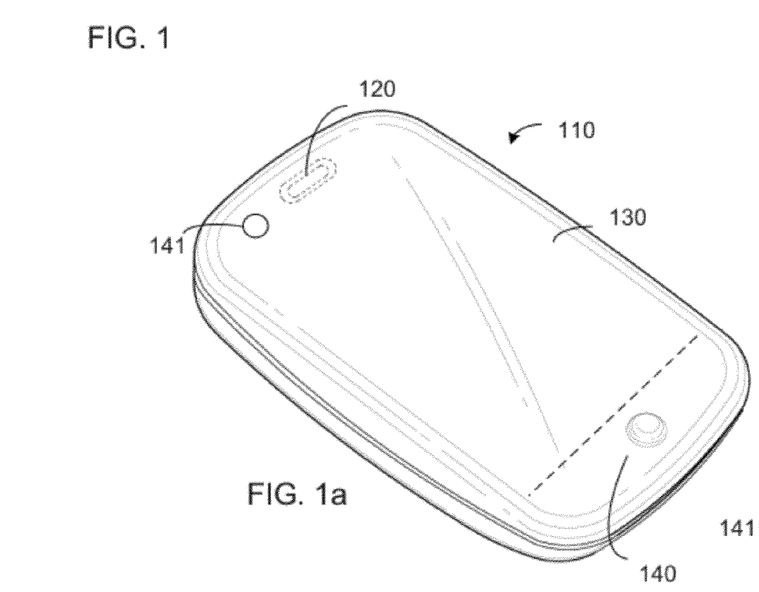
FIG. 1a illustrates one embodiment of a mobile computing device, according to an example embodiment, that displays icons shaded based upon the proximity of a light source relative to the mobile computing device, and the intensity of the light vector emitted by this tight source.
Figure 1B:
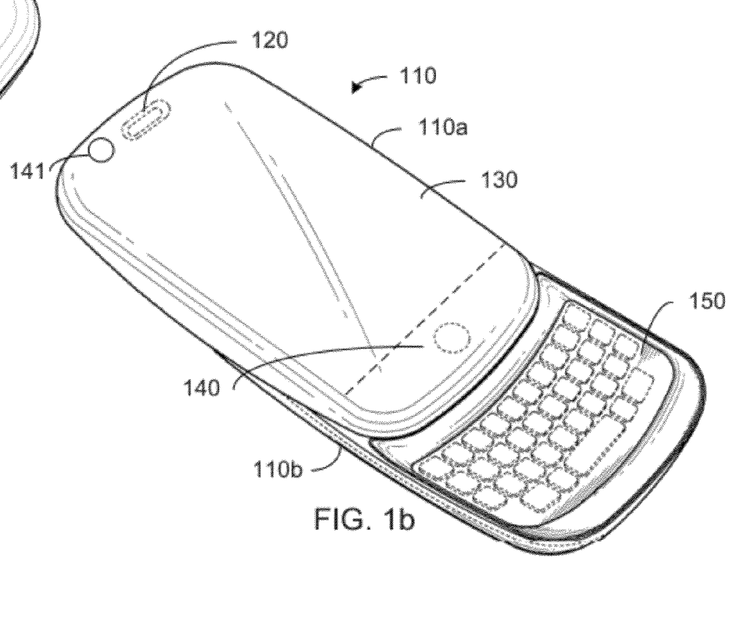
FIG. 1b illustrates one example embodiment of a mobile computing device that displays icons shaded based upon the proximity of a light source relative to the mobile computing device, and the intensity of the light vector emitted by this light source.

FIGS. 1a and 1b illustrate one example embodiment of a mobile computing device 110 that displays icons shaded based upon the proximity of a light source relative to the mobile computing device 110, and the intensity of the light vector emitted by this tight source. FIG. 1a illustrates one embodiment of a first positional state of the mobile computing device 110 having telephonic functionality, e.g., a mobile phone or smartphone, FIG. 1b illustrates one embodiment of a second positional state of the mobile computing device 110 having telephonic functionality, e.g., a mobile phone, state device, smart phone, netbook, or laptop computer. The mobile computing device 110 is configured to host and execute a phone application for placing and receiving telephone calls. In one example embodiment, the configuration as disclosed may be configured for use between a mobile computing device, that may be host device, and an accessory device.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with Public Switched Telephone Networks (PSTN) and/or data networks having Voice over Internet Protocol (VoIP) functionality. Likewise, the mobile computing device 110 is only by way of example, and the principles of its functionality apply to other computing devices, e.g., desktop computers, slate devices, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a Personal Digital Assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grains.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. In one embodiment the screen may be 1.5 inches to 5.5 inches (or 4 centimeters to 14 centimeters) diagonally. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an Active-matrix OLED (AMOLED), an interferometric modulator display (IMOD), a liquid crystal display (LCD), or other suitable display device. In an embodiment, the display displays color images. In another embodiment, the screen 130 further comprises a touch-sensitive display (e,g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130. Also shown is a camera 141 that includes a photometer, a photo sensor, or photo detector used to detect the location and intensity of a light source.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACT FLASH, SD CARD, XD CARD, MEMORY STICK, MULTIMEDIA CARD, SDIO, and the like.

Figure 2:
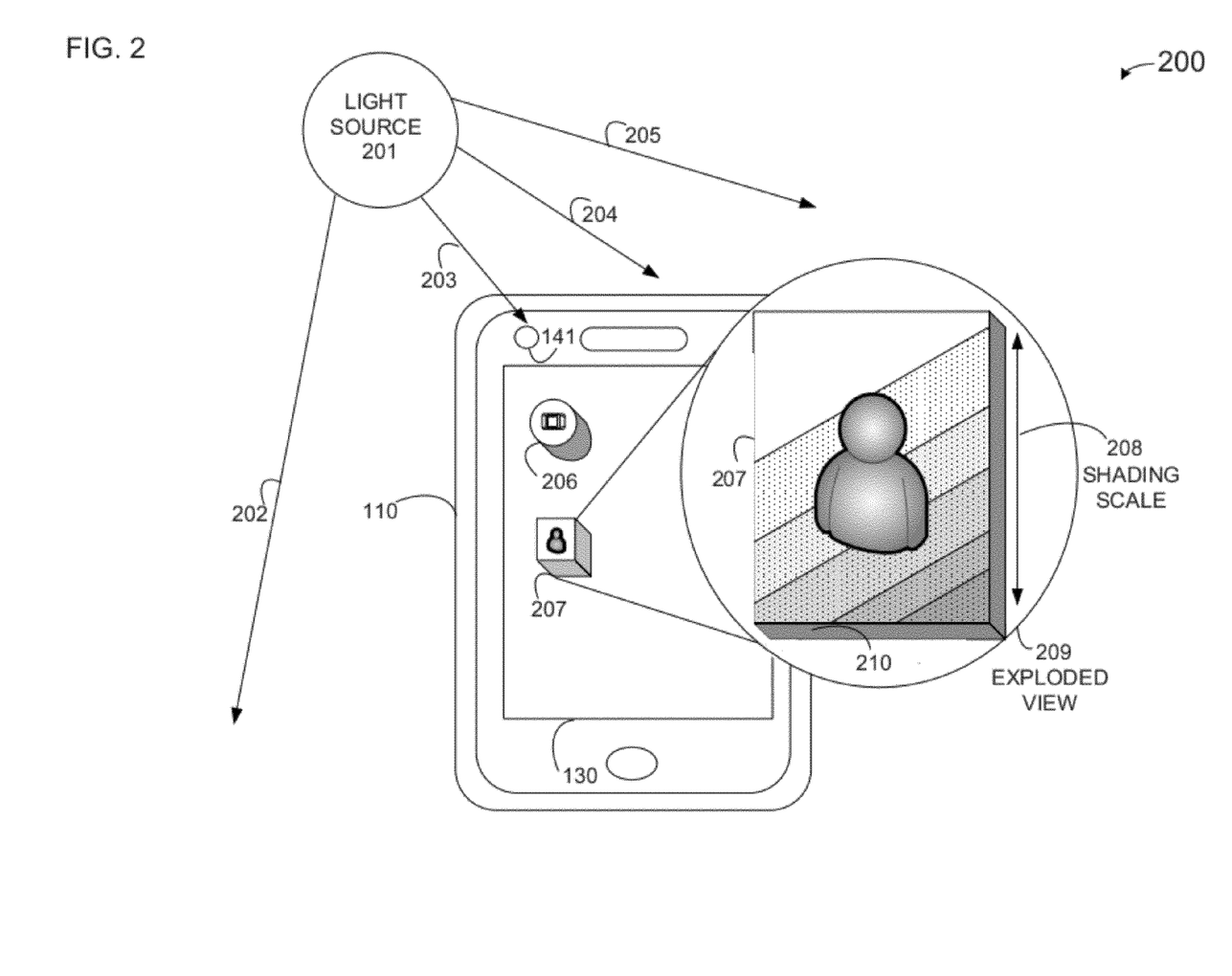
FIG. 2 is a diagram of a system, according to an example embodiment, for generating a depth perception of icons based upon a light direction and intensity sensed by a photometer included in a camera of a mobile computing device.

FIG. 2 is a diagram of an example system 200 for generating a depth perception of icons based upon a light direction and intensity sensed by a photometer included in a camera of a mobile computing device. Shown is the mobile computing device 110 that is displaying an icon 206 and icon 207 on the screen 130. A light source 201 emits light vectors 202-205, with the light vector 203 being detected by the photometer included in the camera 141. Based upon the direction and intensity of the light source 201 and the light vector 203 the icons 206 and 207 are shaded. For example, exploded view 209 shows the shading of the icon 207, where this shading is along a shading scale 208. The shading scales 208 depicts icons pixels located closer to the light source 201 being shaded more lightly relative to icon pixels located further away from the light source. In some example embodiments, as shown at 210, a "Z" pixel value may be shaded to give the icon a proper depth. This "Z" pixel value is based upon the direction and intensity of the light source 201.

Figure 3:
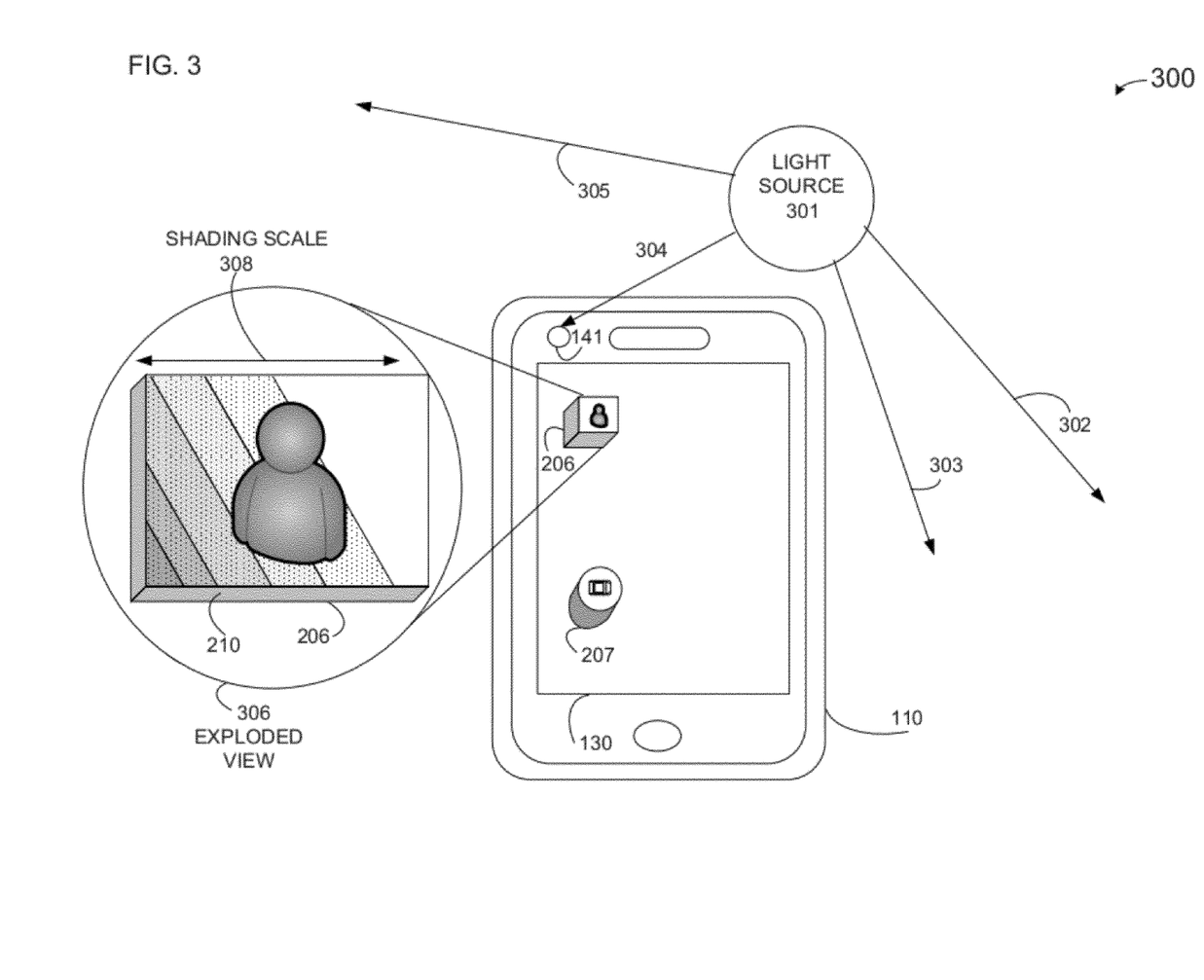
FIG. 3 is a diagram of a system, according to an example embodiment, for generating a depth perception of icons based upon a light direction and intensity sensed by a photometer included in a camera of a mobile computing device.

FIG. 3 is a diagram of an example system 300 for generating a depth perception of icons based upon a light direction and intensity sensed by a photometer included in a camera of a mobile computing device. Shown is the mobile computing device 110 that is displaying the icon 206 and icon 207 on the screen 130. A light source 301 emits light vectors 302-305, with the light vector 304 being detected by the photometer included in the camera 141. Based upon the direction and intensity of the light source 301 and the light vector 304 the icons 206 and 207 are shaded. For example, exploded view 306 shows the shading of the icon 206, where this shading is along a shading scale 308. The shading scales 308 depicts icons pixels located closer to the light source 301 being shaded more lightly relative to icon pixels located further away from the light source. As compared to FIG. 2, the icon 206 of FIG. 3 is shaded along a different shading scale due to the position and intensity of the light source 301 as compared to the light source 201.

Figure 4:
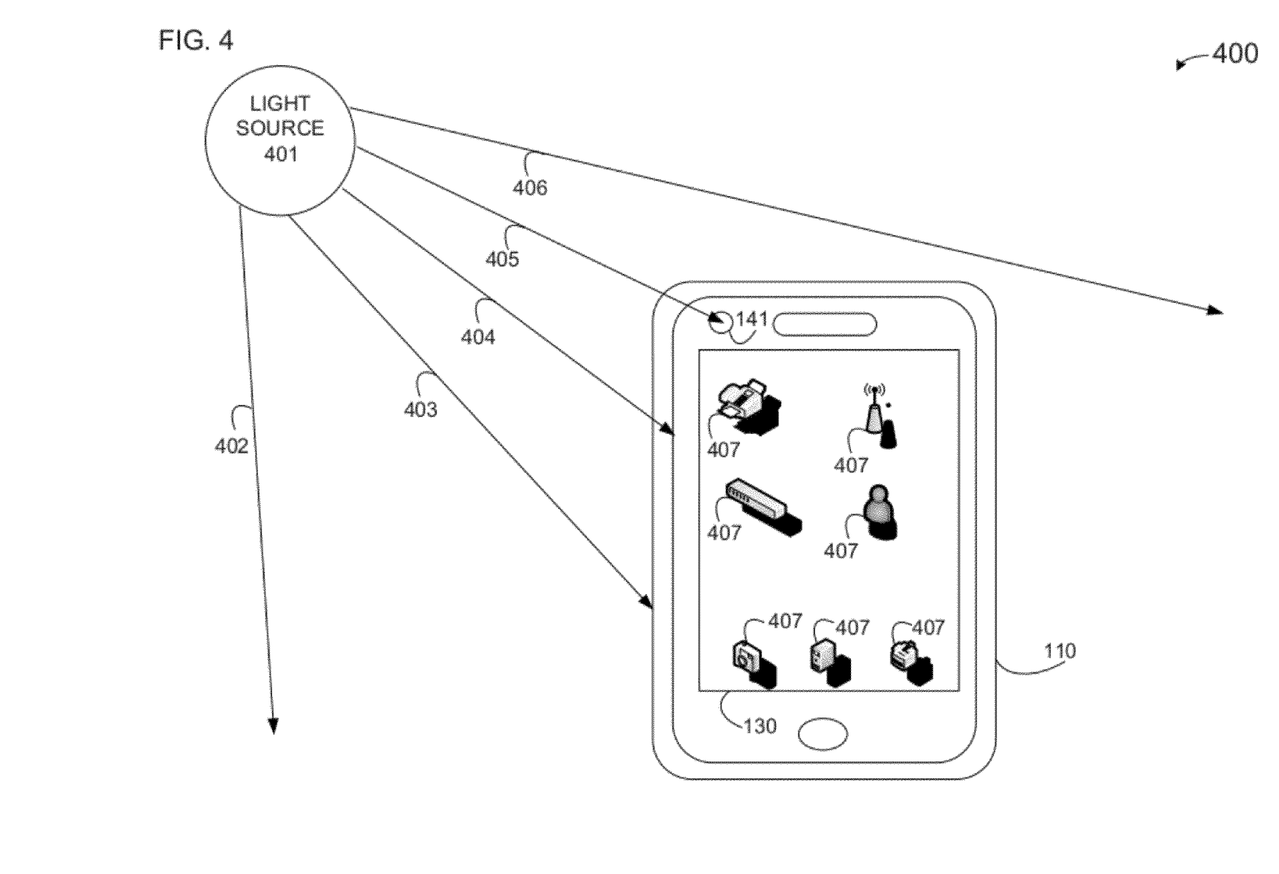
FIG. 4 is a diagram of a system, according to an example embodiment, for generating icon shadows based upon a light direction and intensity sensed by a photometer included in a camera of a mobile computing device.

FIG. 4 is a diagram of an example system 400 for generating icon shadows based upon a light direction and intensity sensed by a photometer included in a camera of a mobile computing device. A light source 401 emits light vectors 402-406, with the light vector 405 being detected by the photometer included in the camera 141. Based upon the direction and intensity of the light source 401 and the light vector 405, the icons 407 emit a shadow that is projected onto the side opposite from the light source 401. The area of a shadow is equal to an area less than or equal to the display area taken up by an icon 407.

Figure 5:
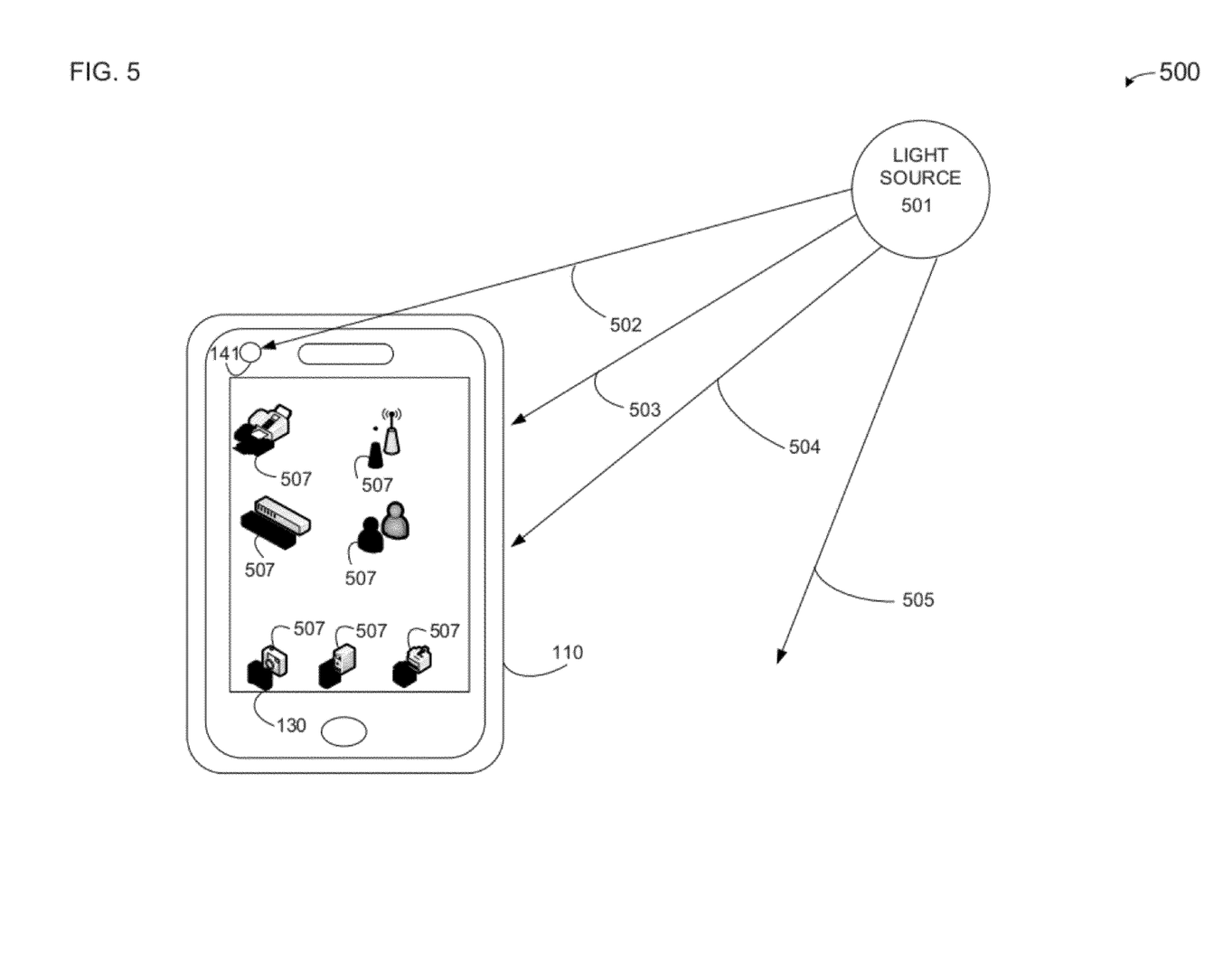
FIG. 5 is a diagram of a system, according to an example embodiment, for generating icon shadows based upon a light direction and intensity sensed by a photometer included in a camera of a mobile computing device.

FIG. 5 is a diagram of an example system 500 for generating icon shadows based upon a light direction and intensity sensed by a photometer included in a camera of a mobile computing device. A light source 501 emits light vectors 502-505, with the light vector 502 being detected by the photometer included in the camera 141. Based upon the direction and intensity of the light source 501 and the light vector 502, the icons 507 emit a shadow that is projected onto the side opposite from the light source 501. The area of a shadow is equal to an area less than or equal to the display area taken up by an icon 507. As compared to FIG. 4, the icon 507 of FIG. 5 is shadowed in a different direction due to the position and intensity of the light source 501 as compared to the light source 401.

Figure 6:
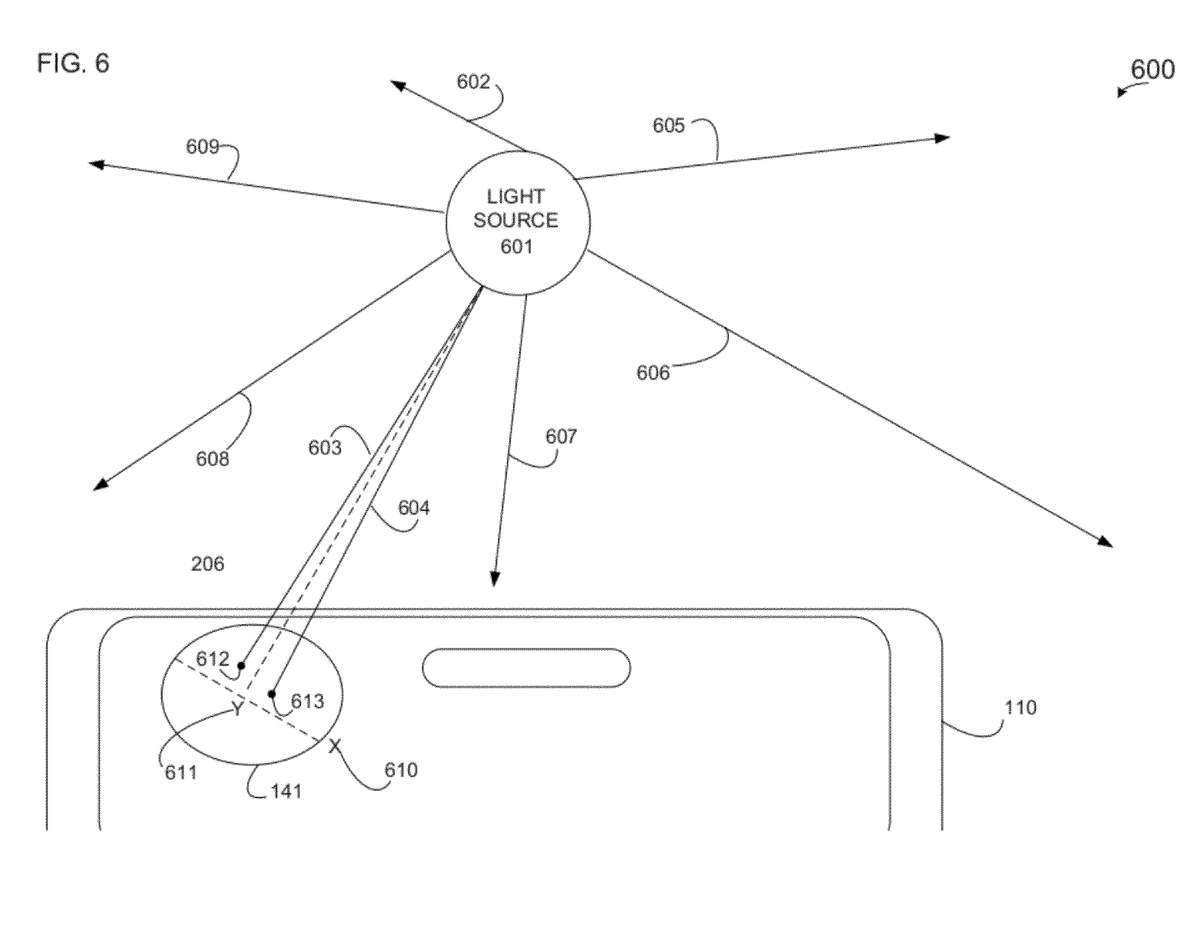
FIG. 6 is a diagram of a system, according to an example embodiment, used by a mobile computing device to detect the location of a light source.

FIG. 6 is a diagram of an example system 600 used by a mobile computing device to detect the location of a light source. Shown is a light source 601 that emits tight vectors 602-609. Light vectors 603 and 604 are detected by the photometer of the camera 141. Detection occurs at detection points 612 and 613, where a location of 612 and 613 can be determined along the "X" axis 610 and the "Y" axis 611. Using these detection points 612 and 613, a location of the light source 601 can determined such that a direction of the light source 601 may be calculated. In some example embodiments, triangulation is used whereby the detection points 612 and 613 serve as the basis for calculating the distance to the light source. As will be discussed in more detail below, the distance and direction of the light source 601 along with intensity of tight vector 603 and 604 detected at the detection points 612 and 613 are used to shade icons appearing on the screen 130 of the mobile computing device 110.

Figure 7:
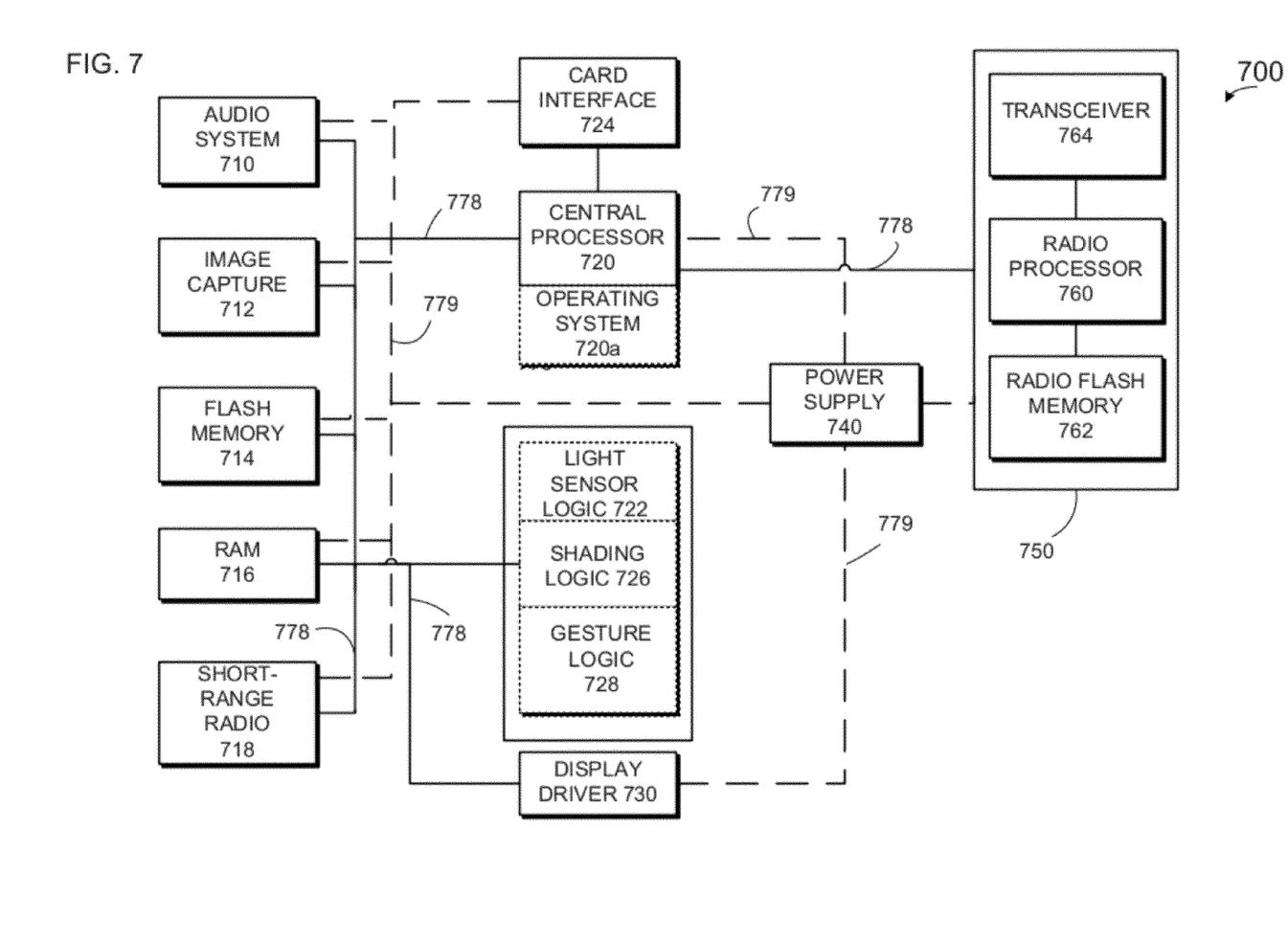
FIG. 7 is a block diagram illustrating an architecture, according to an example embodiment, of a mobile computing device enabled to shade icons based upon the direction and intensity of a light source.

Referring next to FIG. 7, a block diagram illustrates an example architecture of a mobile computing device 110, enabled to shade icons based upon the direction and intensity of a light source. By way of example, the architecture illustrated in FIG. 7 will be described with respect to the mobile computing device of FIG. 1a, 1b, 3, 4, or 5. The mobile computing device 110 includes a central processor 720, a power supply 740, and a radio subsystem 750. Examples of a central processor 720 include processing chips and system based on architectures such as ARM (including cores made by microprocessor manufacturers), ARM XSCALE, QUALCOMM SNAPDRAGON, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 720 is configured for operation with a computer operating system 720a. The operating system 720a is an interface between hardware and an application, with which a user typically interfaces. The operating system 720a is responsible for the management and coordination of activities and the sharing of resources of the mobile computing device 110. The operating system 720a provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, and LINUX.

The central processor 720 communicates with an audio system 710, an image capture subsystem (e.g., camera, video, photo detector, or scanner) 712, flash memory 714, RAM memory 716, and a short range radio module 718 (e.g., Bluetooth, Wireless Fidelity (WiFi) component (e.g., IEEE 802.11, 802.20, 802.15, 802.16)). The central processor 720 communicatively couples these various components or modules through a data line (or bus) 778. The power supply 740 powers the central processor 720, the radio subsystem 750 and a display driver 730 (which may be contact- or inductive-sensitive). The power supply 740 may correspond to a direct current source (e.g., a battery pack, including rechargeable) or an alternating current (AC) source. The power supply 740 powers the various components through a power line (or bus) 779.

The central processor communicates with applications executing within the mobile computing device 110 through the operating system 720a. In addition, intermediary components, for example, a light sensor logic module 722 and shading logic module 726, provide additional communication channels between the central processor 720 and operating system 720 and system components, for example, the display driver 730.

It is noted that in one embodiment, central processor 720 executes logic (e.g., by way of programming, code, or instructions) corresponding to executing applications interfaced through, for example, the navigation area 140 or switches. It is noted that numerous other components and variations are possible to the hardware architecture of the computing device 700, thus an embodiment such as shown by FIG. 7 is just illustrative of one implementation for an embodiment.

In one example embodiment, a shading logic module 726 is shown that is software (e.g., integrated with the operating system) or firmware (lower level code that resides in a specific memory for that code and for interfacing with specific hardware, e.g., the processor 720). The shading logic module 726 is configured to shade icons appearing on a display based upon the direction of a light source and the intensity of this source.

In one example embodiment, a gesture logic module 728 is shown that is software (e.g., integrated with the operating system) or firmware (lower level code that resides in specific memory for that code and for interfacing with specific hardware, e.g., the processor 720). This gesture logic module 728 is executed to determine the gesture associated with the "X," "Y," and "Z" axes values received as data.

The radio subsystem 750 includes a radio processor 760, a radio memory 762, and a transceiver 764. The transceiver 764 may be two separate components for transmitting and receiving signals or a single component for both transmitting and receiving signals. In either instance, it is referenced as a transceiver 764. The receiver portion of the transceiver 764 communicatively couples with a radio signal input of the device 110, e.g., an antenna, where communication signals are received from an established call (e.g., a connected or on-going call). The received communication signals include voice (or other sound signals) received from the call and processed by the radio processor 760 for output through the speaker 120. The transmitter portion of the transceiver 764 communicatively couples a radio signal output of the device 110, e.g., the antenna, where communication signals are transmitted to an established (e.g., a connected (or coupled) or active) call. The communication signals for transmission include voice, e.g., received through the microphone of the device 110, (or other sound signals) that is processed by the radio processor 760 for transmission through the transmitter of the transceiver 764 to the established call.

In one embodiment, communications using the described radio communications may be over a voice or data network. Examples of voice networks include Global System of Mobile (GSM) communication system, a Code Division Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 750, the basic components shown provide the ability for the mobile computing device to perform radio-frequency communications, including telephonic communications. In an embodiment, many, if not all, of the components under the control of the central processor 720 are not required by the radio subsystem 750 when a telephone call is established, e.g., connected or ongoing. The radio processor 760 may communicate with central processor 720 using the data line (or bus) 778.

The card interface 724 is adapted to communicate, wirelessly or wired, with external accessories (or peripherals), for example, media cards inserted into the expansion slot (not shown). The card interface 724 transmits data and/or instructions between the central processor and an accessory, e.g., an expansion card or media card, coupled within the expansion slot. The card interface 724 also transmits control signals from the central processor 720 to the expansion slot to configure the accessory. It is noted that the card interface 724 is described with respect to an expansion card or media card; it also may be structurally configured to couple with other types of external devices for the device 110, for example, an inductive charging station for the power supply 740 or a printing device.

Figure 8:
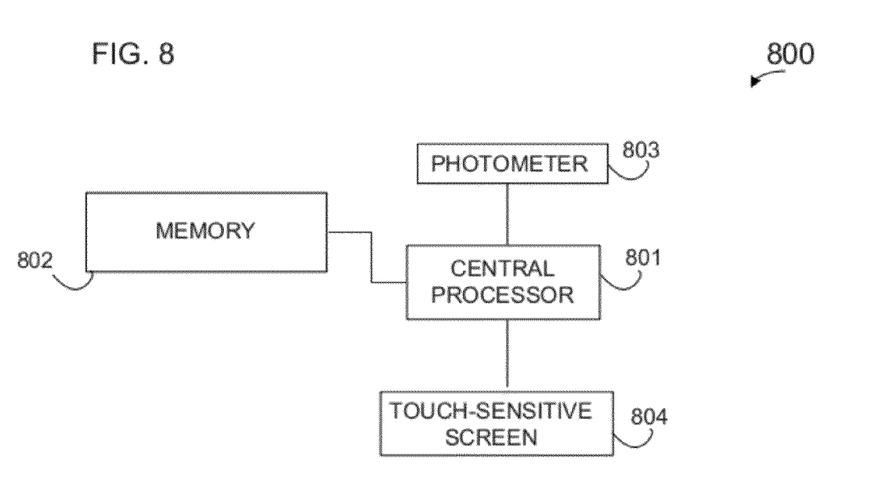
FIG. 8 is an example apparatus, according to an example embodiment, used to generate a depth perception of icons based upon a light direction and intensity sensed by a photometer included in a camera of a mobile computing device.

FIG. 8 is an example apparatus 800 used to generate a depth perception of icons based upon a light direction and intensity sensed by a photometer included in a camera of a mobile computing device. Shown is an apparatus 800 an example of which is the mobile computing device 110. Included in this apparatus 800 is a processor 801 operatively connected to a memory 802. Operatively connected includes a logical or physical connection. A photometer 803 is operatively connected to the processor 801, the photometer 803 to receive a light vector, the photometer 803 to determine intensity of the light vector. The processor 801 is used to determine a location of a light source that generates the light vector. Operatively connected to the processor 801 is a touch-sensitive screen 804 to display an icon pixel shaded based upon the intensity of the light vector and the location of the light source. In some example embodiments, the location of the light source is determined through triangulation that uses the light vector to calculate a distance to the light source. Additionally, the icon pixel may be shaded darker than an additional icon pixel based upon the icon pixel being located farther away from the light source as compared to the additional icon pixel. Further, the icon pixel may be located along at least one of a "X", "Y" or "Z" axis of a bit map. Moreover, the touch-sensitive screen 804 displays a shadow of the icon pixel, the shadow based upon the intensity of the light vector and the location of the light source.

Figure 9:
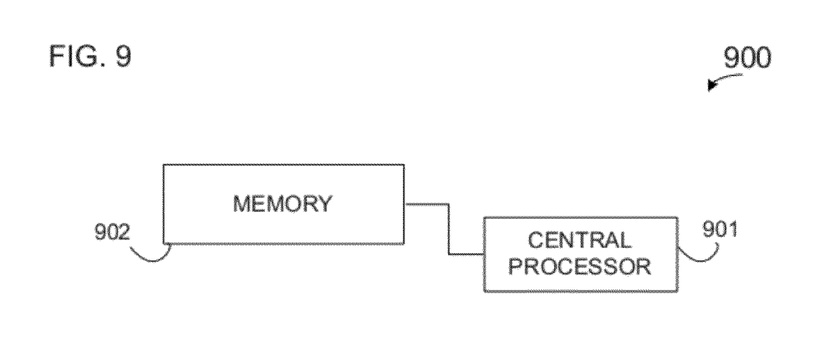
FIG. 9 is an apparatus, according to an example embodiment, used to generate a depth perception of icons based upon a light direction and intensity sensed by a photometer included in a camera of a mobile computing device.

FIG. 9 is an example apparatus 900 used to generate a depth perception of icons based upon a light direction and intensity sensed by a photometer included in a camera of a mobile computing device. Shown is a processor 901 operatively connected to a memory 902. The memory 902 includes logic encoded in one or more tangible media for execution and when executed operable to receive a light vector from the light source, the light vector having an intensity value associated with it. Additionally, the memory 902 included logic executed to retrieve a color value for a icon pixel associated with an icon image. Further, the memory 902 includes logic executed to shade the icon pixel based upon intensity value and the color value. The memory 902 includes logic executed to shade the icon pixel based upon calculating the sum of color value and the quotient of the intensity value divided by three. In some example embodiments, the color value is at least one of a web color value, or an X11 color value. In some example embodiments, the icon pixel is located along at least one of a "X", "Y" or "Z" axis of a bit map. The memory 902 includes logic that is executed to shade the icon pixel a lighter color relative to an additional icon pixel, the icon pixel located closer to the light source than the additional icon pixel.

Figure 10:
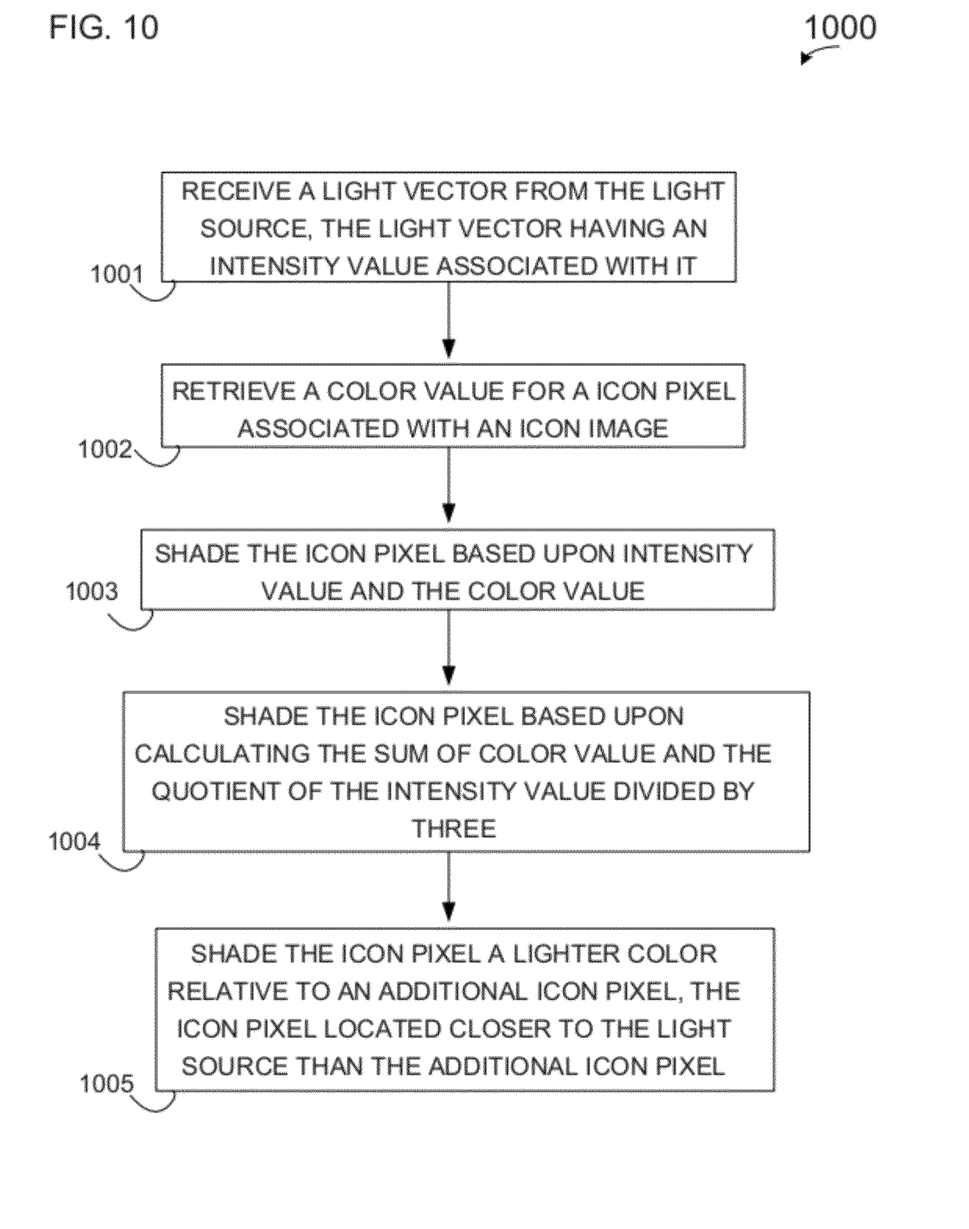
FIG. 10 is a method, according to an example embodiment, executed to generate a depth perception of icons based upon a light direction and intensity sensed by a photometer included in a camera of a mobile computing device.

FIG. 10 is an example method 1000 executed to generate a depth perception of icons based upon a light direction and intensity sensed by a photometer included in a camera of a mobile computing device. This method 1000 is executed on the mobile computing device 110. Operation 1001 is executed to receive a light vector from the light source, the light vector having an intensity value associated with it. Operation 1002 is executed to retrieve a color value for a icon pixel associated with an icon image. Operation 1003 is executed to shade the icon pixel based upon intensity value and the color value. Operation 1004 is executed to shade the icon pixel based upon calculating the sum of color value and the quotient of the intensity value divided by three. In some example embodiments, the color value is at least one of a web color value, or an X11 color value. In some example embodiments, the icon pixel is located along at least one of a "X", "Y" or "Z" axis of a bit map. Operation 1005 is executed to shade the icon pixel a lighter color relative to an additional icon pixel, the icon pixel located closer to the light source than the additional icon pixel.

Figure 11:
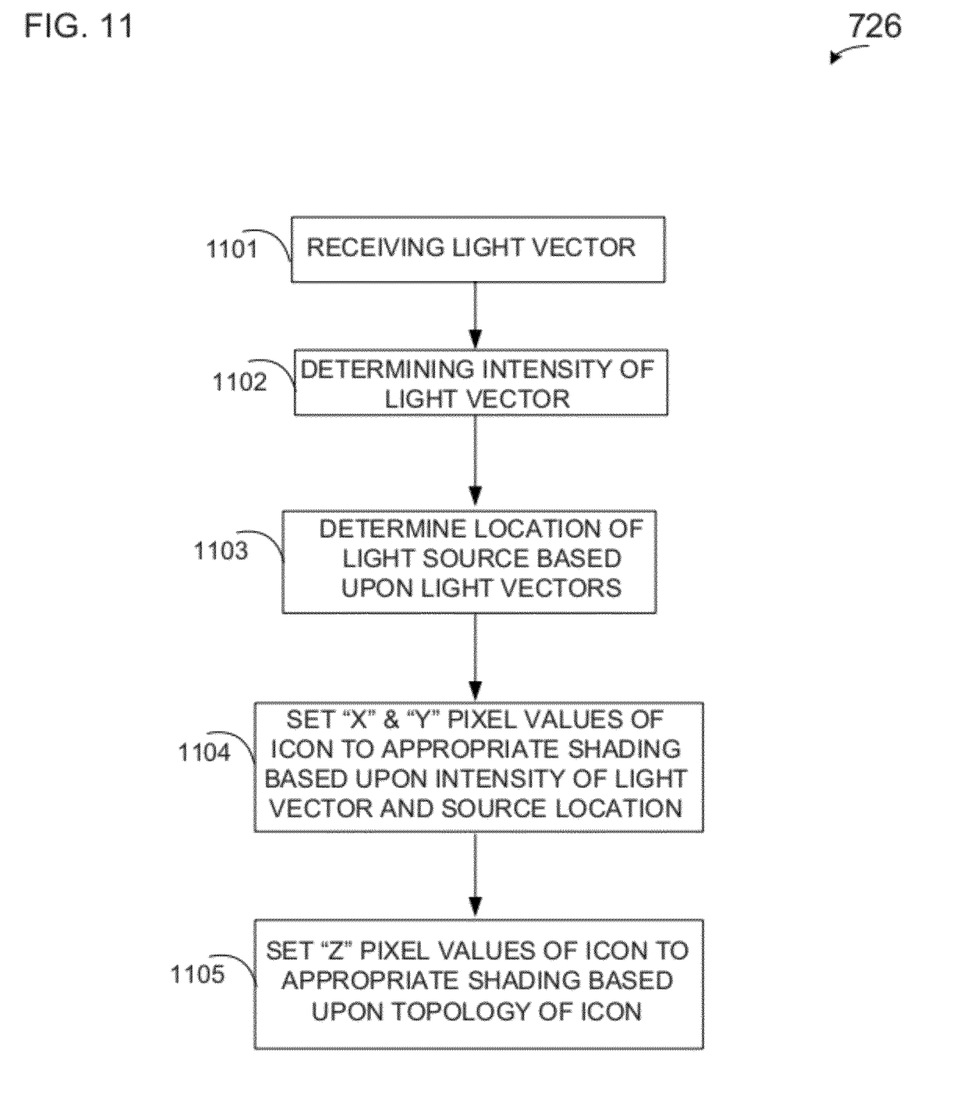
FIG. 11 is flow chart illustrating a method, according to an example embodiment, implemented by the shading logic module.

FIG. 11 is a flow chart illustrating an example method implemented by the shading logic module 726. Shown is an operation 1101 that is executed to receive a light vector. Operation 1102 is executed to determine the intensity of a light vector in terms of candelas (cd). This cd value may be normalized to be a whole number. Operation 1103 is executed to determine the location of a light source based upon the light vectors. Operation 1104 is executed to set an "X" and "Y" pixel value for an icon to an appropriate shading, where appropriate is determined based upon the intensity of the light vector and the light source location. Operation 1105 is executed to set a "Z" pixel value of the icon to appropriately shade the icon based upon the topology of the icon.

Figure 12:
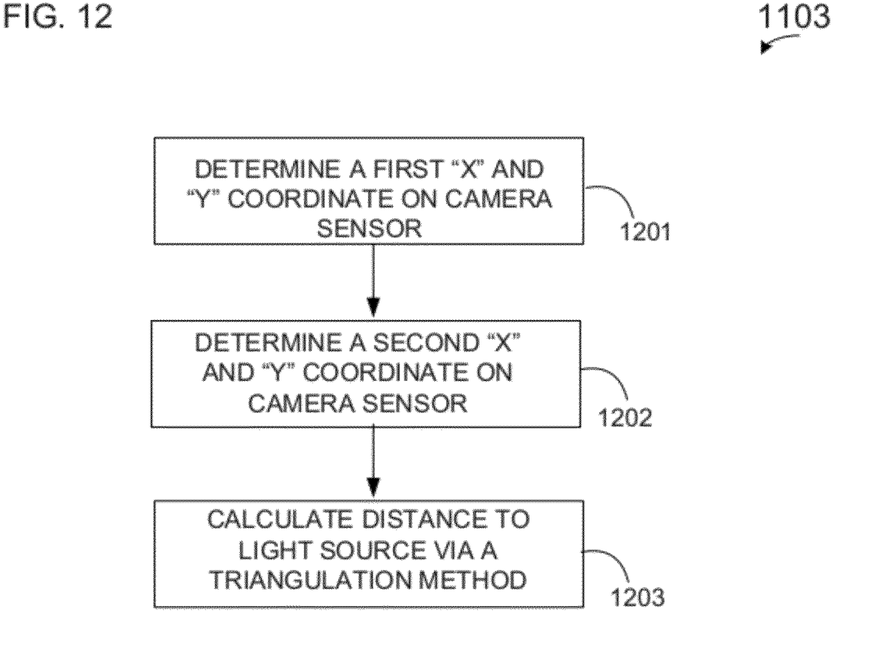
FIG. 12 is a flow chart illustrating a method, according to an example embodiment, used to execute an operation used to determine the location of the light source based upon tight vectors.

FIG. 12 is a flow chart illustrating an example method used to execute operation 1103 used to determine the location of the light source based upon light vectors. Operation 1201 is executed to determine a first "X" and "Y" coordinate on a camera sensor (i.e., a photometer included in a camera of a mobile computing device). Operation 1202 is executed to determine a second "X" and "Y" coordinate on a camera sensor (i.e., a photometer included in a camera of a mobile computing device). The first and second "X" and "Y" coordinates roughly correspond to the detection points 612 and 613. Operation 1203 is executed to calculate the distance to the light source via a triangulation method. Triangulation is a principle taught in U.S. Pat. No. 6,211,506 entitled "Method and Apparatus for Optically Determining the Dimension, Location and Attitude of Objects", issued to Pryor et al. in April 2001, which is incorporated by reference in its entirety.

Figure 13:
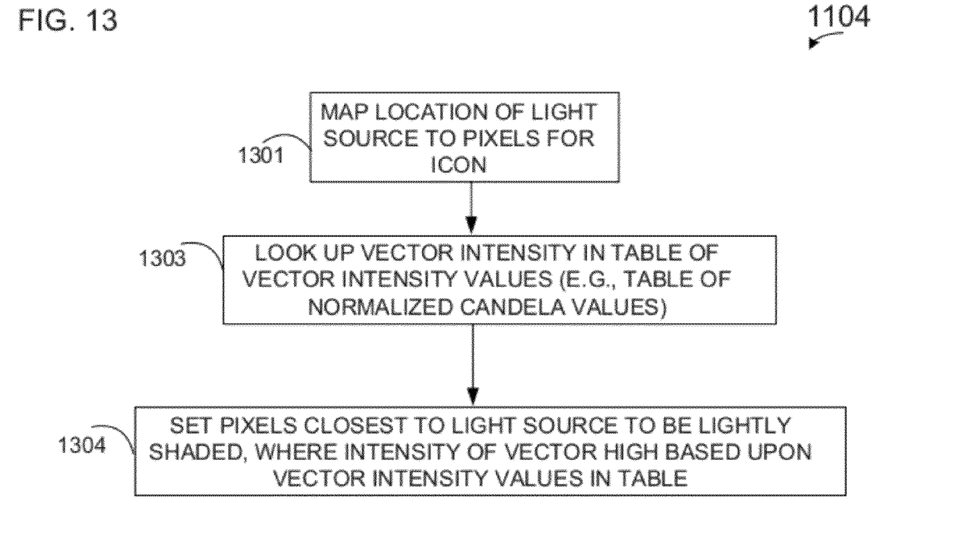
FIG. 13 is a flow chart illustrating a method, according to an example embodiment, used to execute an operation that sets "X" and "Y" pixel values to an appropriate shading based upon the intensity and location of a source location.

FIG. 13 is a flow chart illustrating an example method used to execute operation 1104 that sets "X" and "Y" pixel values to an appropriate shading based upon the intensity and location of a source location. Operation 1301 is executed to map location of tight source to pixels for an icon. Specifically, through the execution of operation 1301 icon pixels (i.e., those located along the "X", "Y" and "Z" axes) affected by a light source are identified. Operation 1303 is executed to look up vector intensities in a table of vector intensity values (e.g., a table of normalized cd values). Operation 1304 is executed to set pixels closest to the light source to be lightly shaded, where the intensity of the vector is high based upon the vector intensity values provided by the table.

Figure 14:
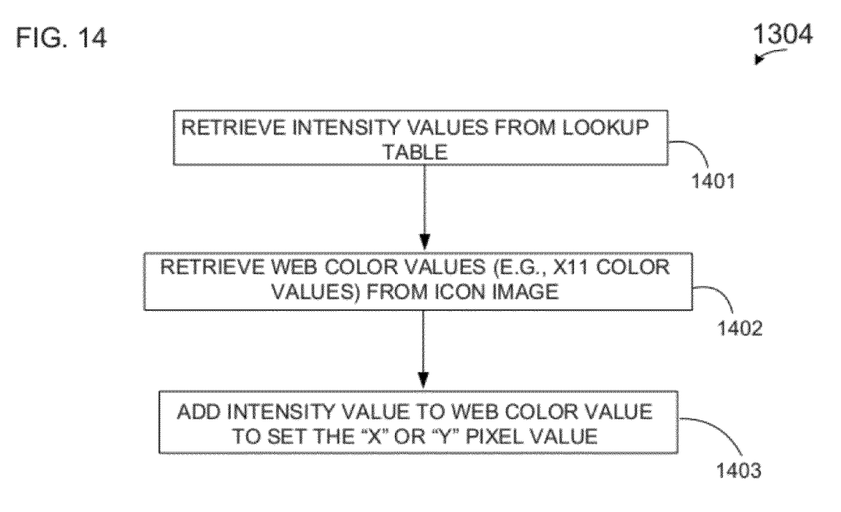
FIG. 14 is a flow chart illustrating a method, according to an example embodiment, used to execute operation to set pixels values closest to the light source to be lightly shaded.

FIG. 14 is a flow chart illustrating an example method used to execute operation 1304 to set pixels values closest to the light source to be lightly shaded. Operation 1401 is executed to retrieve intensity values from a look up table. In some example embodiments, a numeric representation of the intensity of a light vector is generated by the photometer that is part of a camera 141 of a mobile computing device 110. This numeric value may be normalized to be a whole number that falls with the range of 0-765. Using this numeric value, a vector intensity (Vi) value in candelas is retrieved from the look up table. The below table 1 is an example of the lookup table:

| Numeric Representation from Photometer | Vector Intensity (Vi) Values in Candelas |
|---|---|
| 0 | 0 |
| 1 | 199 |
| 2 | 244 |
| 3 | 367 |
| 4 | 455 |
| 5 | 677 |
| 6 | 765 |

Like the numeric value, the Vi value may be a value between 0-765. Operation 1402 is executed to retrieve a web color value (i.e., decimal or hexadecimal values) from the icon that represents the color of a pixel in the image. Once retrieved, these web color values are looked up in a web color table, a portion of which is shown below as Table 2. Table 2 shows the color of a pixel broken down in terms of red "R", green "G" and blue "B" values, and a sum of these "R", "G", and "B" values as an absolute value:

| | Hex Code | | | Decimal Code | | | Absolute |
|---|---|---|---|---|---|---|---|
| HTML Name | R | G | B | R | G | B | Value |
| GreenYellow | AD | FF | 2F | 173 | 255 | 47 | 475 |
| Chartreuse | 7F | FF | 00 | 127 | 255 | 0 | 382 |
| LawnGreen | 7C | FC | 00 | 124 | 252 | 0 | 376 |
| Lime | 00 | FF | 00 | 0 | 255 | 0 | 255 |
| LimeGreen | 32 | CD | 32 | 50 | 205 | 50 | 305 |

Operation 1403 is executed to set the pixel value using the following formulas, where R, G, and B are the initial pixel values taken from the icon, norm( ) is a normalization function used to round the quotient of Vi/3, and lim( ) sets a ceiling of 255 and floor of 0 for the sum of initial pixel values and the normalized quotient of Vi/3:

$$R'=\lim(R+\text{norm}(Vi/3))$$

$$G'=\lim(G+\text{norm}(Vi/3))$$

$$B'=\text{norm}(Vi/3))$$

R', G' and B' if represent the value of the "X" and "Y" pixel values set to an appropriate shading based upon the intensity of the light vector and the source location. This same method of operation 1403 may be applied to a "Z" pixel value as well. In some example embodiments, a filtering function fil( ) is applied to the quotient of Vi/3 so as to weight this quotient. The result of weighting this quotient is that the R', G' and/or B' values may be emphasized beyond what is shown based upon the light source 201 illuminating the mobile computing device 110.

In one example embodiment, an icon pixel is looked up in a web color table and is found to have a color of green yellow. This green-yellow color has an "R" value of 173, a "G" value of 255, and a "B" value of 47. The intensity of the light vector hitting the photometer, that is part of a camera of a mobile computing device 110, is determined to be a 4 and is further determined to have a Vi of 455. Applying the operation 1403, R'=255 and G'=255 this is due to the limit function (lim( ), and B'=199. As a result, the pixel is shaded from green yellow (R=173, G=255, B=47) to light yellow (R'=255, G'=255, B'=199). As discussed above, pixels located closer to the light source as determined via the execution of operation 1203 will he lighter than those pixels located father away from the light source. Further, pixels located along the "Z" axis of the icon will be shaded more or less lightly base upon the topology of the icon and the proximity of the pixel along the "Z" axis to the light source. The shading of "Z" axis pixels can be facilitated using the above illustrated operation 1403.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A mobile computing device comprising:
  a single photometer to receive a plurality of light vectors, the single photometer to determine intensity values of each light vector of the plurality of light vectors;
  a processor to determine a location of a light source that generated the light vectors; and
  a touch-sensitive screen to display an icon pixel comprising a color value, the icon pixel shaded based upon dividing the intensity values by three and adding the color value.

2. The mobile computing device of claim 1, wherein the location of the light source is determined through triangulation that uses the plurality of light vectors to calculate a distance to the light source.

3. The mobile computing device of claim 1, wherein the icon pixel is shaded darker than an additional icon pixel based upon the icon pixel being located farther away from the light source as compared to the additional icon pixel.

4. The mobile computing device of claim 3, wherein the icon pixel is located along at least one of a "X", "Y" or "Z" axis of a bit map.

5. The mobile computing device of claim 1, wherein the touch-sensitive screen displays a shadow of the icon pixel, the shadow based upon the intensity of the light vector and the location of the light source.

6. A non-transitory computer-readable medium comprising program code that when executed by a processor is configured to cause the processor to:
receive, through a single photometer a plurality of light vectors from a light source, the plurality of light vectors each having an intensity value associated with it;
retrieve a color value for an icon pixel associated with an icon image; and
shade the icon pixel based upon dividing the intensity values by three and adding the color value.

7. The non-transitory computer-readable medium of claim 6, wherein the color value is at least one of a web color value, or an X11 color value.

8. The non-transitory computer-readable medium of claim 6, wherein the icon pixel is located along at least one of a "X", "Y" or "Z" axis of a bit map.

9. The non-transitory computer-readable medium of claim 6, further comprising program code that when executed by a processor is configured to cause the processor to shade the icon pixel a lighter color relative to an additional icon pixel, the icon pixel located closer to the light source than the additional icon pixel.

10. A computer system comprising:
at least one processor;
a memory in communication with the at least one processor, the memory including logic encoded in one or more tangible media for execution and when executed operable to:
receive, through a single photometer light vectors from a light source, the light vectors each having an intensity value associated with it;
retrieve a color value for an icon pixel associated with an icon image; and
shade the icon pixel based upon dividing the intensity values by three and adding the color value.

11. The computer system of claim 10, wherein the color value is at least one of a web color value, or an X11 color value.

12. The computer system of claim 10, wherein the icon pixel is located along at least one of a "X", "Y" or "Z" axis of a bit map.

13. The computer system of claim 10, wherein the logic encoded in one or more tangible media for execution and when executed is further operable to shade the icon pixel a lighter color relative to an additional icon pixel, the icon pixel located closer to the light source than the additional icon pixel.

* * * * *